Nov. 17, 1970  H. R. STILES  3,541,503
OPTICAL GLIDE SLOPE REFERENCE INDICATOR FOR AIRCRAFT
Filed Oct. 27, 1969

INVENTOR.
HALLETT R. STILES
BY
ATTORNEYS

United States Patent Office 3,541,503
Patented Nov. 17, 1970

3,541,503
OPTICAL GLIDE SLOPE REFERENCE INDICATOR FOR AIRCRAFT
Hallett R. Stiles, San Diego, Calif., assignor to the United States of America as represented by the Secretary of the Navy
Filed Oct. 27, 1969, Ser. No. 869,523
Int. Cl. G08g 5/00
U.S. Cl. 340—25                                3 Claims

ABSTRACT OF THE DISCLOSURE

An optical glide slope reference indicator simultaneously provides the pilot of an aircraft with elevation and azimuth information relative to the intended point of landing. The indicator presents on a gun-sight type reflector plate positioned in the pilot's line of sight of the landing area, a set of optically generated reference signals by which the pilot can monitor a preferred glide slope. An optical processor in the aircraft projects on the reflector plate two horizontally aligned reference symbols (datum bars) and a third symbol (meatball) which is displaced vertically between the two datum bars as a function of the position of the aircraft from the preferred glide slope. The composite optically processed image is superimposed on the reflector plate and is focused at infinity. In landing, the properly aligned glide slope indicator visual image is superimposed over the actual image of the landing area, and the aircraft is controlled by the pilot with reference to the relative position of the indicator to the desired touchdown point, as seen by the pilot, along a preselected flight path.

STATEMENT OF GOVERNMENT INTEREST

This invention described herein may be manufactured and used by or for the Government of the United States of America for governmental purposes without the payment of any royalties thereon or therefor.

BACKGROUND OF THE INVENTION

Recently, new systems concepts concerned with the pilot-and-airplane system were introduced, predicated on translating the pilot's day-to-day capability for visual flight into the instrument-flight environment. Known as "windshield" or "head-up" displays, these new devices differ from traditional panel instruments in that the pilot can look at the runway through the windshield and simultaneously obtain instrumented flight control and situation information. The windshield display provides depth, a dimension that is impossible to achieve by conventional "head-down" systems.

The existing head-up display systems and other optical and Fresnel optical landing systems are incapable, however, of providing simultaneous azimuth and elevation information to the pilot superimposed on the intended point of landing. This situation is especially critical for aircraft which are intended to land on aircraft carriers. The existing systems do not give glide slope information relative to the intended point of landing on the aircraft carrier but instead, relative to some other portion of the runway where the apparatus for generating glide slope information is located. Accordingly, with existing optical glide slope references, the pilot must look at the runway center line for azimuth information, and he must look off to one side of the runway for glide slope information so that it is virtually impossible to keep both sources of information in view at the same time.

SUMMARY OF THE INVENTION

The invention comprises an inherently reliable optical landing aid that provides a visual glide slope indication. The invention greatly facilitates pilot transition from an electrically generated to an optically generated glide slope since the pilot can carefully scrutinize his position, both in azimuth and elevation, simultaneously on the intended point of landing on a conventional runway or an aircraft carrier deck. The landing aid includes a source of white light located beneath the centerline of the runway in the vicinity of the intended point of landing of the aircraft. Appropriate optical apparatus is arranged in the path of the white light for producing a vertically disposed light spectrum consisting of at least three discrete and different diverging colored beams which are transmitted into the atmosphere in the vicinity of the runway approach. Two omnidirectional, monochromatic light sources are located on opposite sides of the optical means for producing two parallel reference light beams which are also transmitted into the atmosphere in the vicinity of the runway approach. In the aircraft optical processor apparatus is provided, for refracting the received beams and for projecting the refracted beams onto a transparent display apparatus which is located in the line of sight of the pilot. By observing on the display apparatus the vertical displacement of the refracted colored beam ("meatball") with respect ot the two horizontally aligned reference beams (datum bars) from the monochromatic light sources, the pilot is provided with an indication of his glide slope. If the "meatball" is horizontally aligned with the two datum bars, the aircraft is on the proper glide slope. If the meat ball is above the two datum bars, the aircraft is above the preferred glide slope, and if the meatball is located vertically below the two datum bars, the aircraft is on a glide slope located below the preferred glide slope. By proper maneuvering of the aircraft, the pilot can position the aircraft in the proper glide path. The pilot is not required to distinguish between the transmitted color beams; he merely has to compare the position of the center beam to the position of the reference or datum beams.

STATEMENT OF THE OBJECTS OF THE INVENTION

It is an object of the present invention to provide an inherently reliable optical landing aid that simultaneously superimposes aircraft glide slope and azimuth information upon the intended point of landing.

It is another object of the present invention to provide an optical landing aid offering the advantage of a simple transition from electronic to optical glide slope and azimuth references.

It is another object of the present invention to provide an optical landing air system which provides angle of attack information.

Other objects and many of the attendant advantages of this invention will be readily appreciated as the same becomes better understood by reference to the following detailed description when considered in connection with the accompanying drawings wherein:

DESCRIPTION OF THE PREFERRED EMBODIMENT

Figure 1:
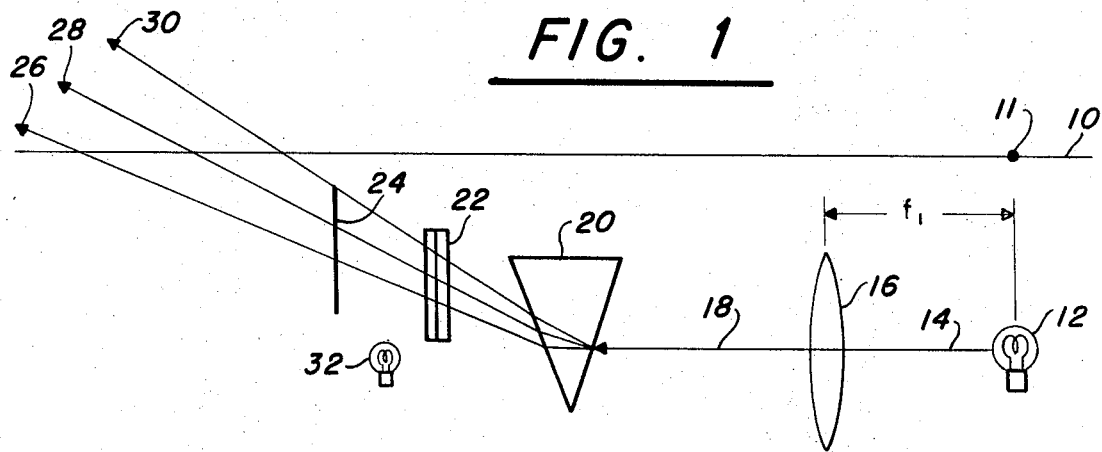
FIG. 1 is an illustration of the optical apparatus of the present invention located below a runway for generating and transmitting glide slope information to approaching aircraft.

FIG. 1 illustrates the optical apparatus of the present invention located below a runway 10 for generating and transmitting glide slope information. The optical apparatus includes a source of white light 12 which produces white light beams 14. The source 12 is located in the focal plane of a collimating lens 16 at a distance equal to the focal length $f_1$ from the lens 16. Positioned directly in front of the lens 16 is a conventional prism 20 which receives the collimated white light beams 18 from the lens 16. The light which is transmitted through prism 20 impinges upon a cylindrical lens 22 and a polarizer 24. Shown being transmitted from prism 20 are three divergent, discrete colored beams 26, 28, and 30 which represent a portion of the spectrum produced by the well-known action of a prism upon white light. Located on both sides of prism 20 are two omnidirectional, monochromatic reference lights 32.

Figure 2:
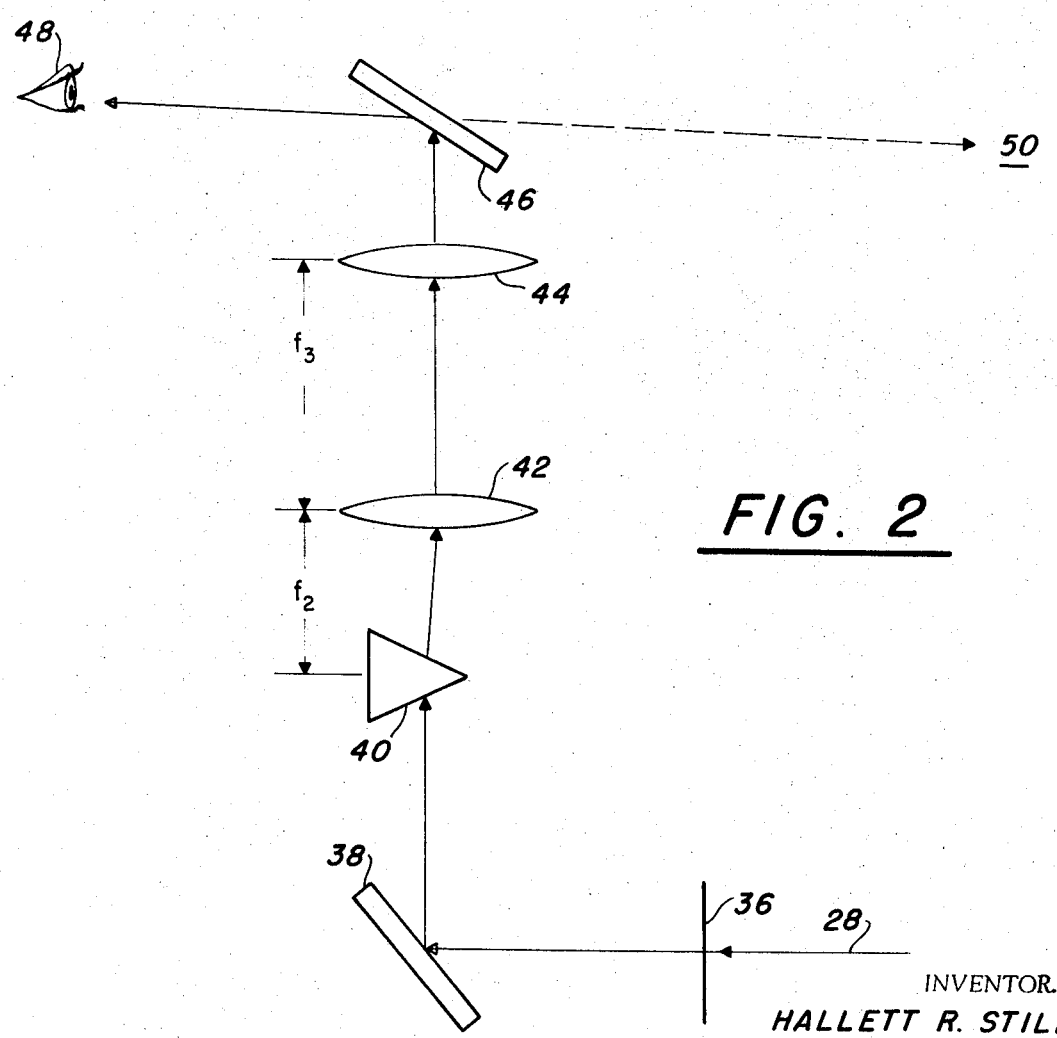
FIG. 2 is an illustration of the optical apparatus of the present invention located within the approaching aircraft for receiving and processing the glide slope information transmitted by the apparatus of FIG. 1.

FIG. 2 illustrates the optical processing apparatus located in the aircraft. In the figure, the light beam 28, for example, is shown as passing through a polarizing transparency 36 and then being reflected by a conventional mirror 38. A prism 40 and two spherical lenses 42 and 44 are positioned in the path of the light which is reflected from the mirror 38. The lenses 42 and 44 constitute a conventional telescope. Prism 40 must be located in the focal plane of the lens 42 at a distance equal to $f_2$, the focal length of the lens 42. A beam splitter 46 is located in the path of the lenses 42 and 44. The beam splitter 46 is aligned with the eye 48 of the pilot, i.e., with the pilot's view of the runway 10 which could be, for example, an aircraft carrier deck.

In operation, the light beams 14 from the white light source 12 are passed through the collimating lens 16. Lens 16 produces parallel white light beams 18 which are passed through the prism 20. In the prism 20, the light beams 18 are dispersed in a conventional manner into the seven color spectrum well-known to those skliled in the art. For purposes of illustration, only three beams 26, 28, and 30, corresponding, for example, to the red, orange, and yellow portions of the spectrum are shown in FIG. 1.

The spectrum or beams 26, 28, and 30 are passed through a cylindrical lens 22 which functions to spread the beams horizontally but not vertically. (It should be noted that the grind of the prism 20 determines the vertical spread of the colored beam.) The colored beams also pass through a polarizing transparency 24 which functions in a well-known manner to polarize the light beams. Simultaneously with the transmission of the colored beams, reference beams from the monochromatic, omnidirectional reference lights 32 are transmitted into the atmosphere.

In the preferred embodiment and for purposes of illustration, it will be asumed that the orange light beam 28 represents the preferred glide slope for a landing on the intended point of landing 11. The red light beam 26 represents the glide slope below the preferred glide slope, and the yellow light beam 30 represents the glide slope above the preferred glide slope 28.

Depending on the approach path of the oncoming aircraft, one of the three colored beams is received by the optical apparatus located in the aircraft as illustrated in FIG. 2. For example, if the plane is flying at the proper glide slope, the orange light beam 28 from the aircraft carrier is optically received and processed in the manner previously described. The light which impinges on the prism 40 is refracted. The degree to which the path of the light changes as it passes through the prism 40 depends on the color, that is, frequency of the beam. Accordingly, since beams 26, 28, and 30 have discrete and different frequencies, the amount of refraction for each of the beams will be different. The refracted light beam is transmitted through the spherical lenses 42 and 44 so that the beam impinges upon a conventional transparent gun sight glass plate 46. The vertical position of the glide slope light beam or "meatball" on the glass plate is a function of the color of the light beam which is received by the optical receiver, and thus indicates the particular glide slope in which the aircraft is located.

Also, impinging on the glass plate gun sight are two optically processed, horizontally aligned and spaced reference light beams or "datum bars" produced by the light sources 32 located below the deck of the runway 10. The "meatball" is positioned symmetrically between the two "datum bars" so that by observing the vertical displacement of the meatball with relation to the two datum bars the pilot is provided with an indication of his position relative to the preferred glide slope. For example, if the "meatball" is located above the datum bars, the pilot can tell that he is on a glide slope represented by the yellow light beam 30 which is above the preferred glide slope represented by the orange light beam 28. Similarly, if the "meatball" is located below the two datum bars, the pilot can tell that he is on a glide slope represented by the red light beam 26 which is below the preferred glide slope. And finally, if the "meatball" is horizontally aligned with the two datum bars, the pilot is assured that he is on the proper glide slope.

By aligning the glide slope light beam image or "meatball" with the two reference light beam images or datum bars, the pilot is provided with glide slope information and by superimposing the composite images over the actual image of the runway, the pilot is provided with angle-of-attack information. Furthermore, by simultaneously observing the runway centerline, the pilot is able to obtain azimuth information.

It should be noted that the visible spectrum transmitted from the center line of the runway need not be created by a prism. For example, a slide with multiple colors could be projected to create an identical effect. Any number of colored filter combinations could be used to produce the transmitted visible spectrum.

The prism 40 must be in focal plane of lens 42 and the focal plane of lenses 42 and 44 must be coincidental between the two lenses. The output of the second lens 42 comprises parallel rays that make the prism 40 appear to be focused in infinity. Accordingly, by looking into the second lens 44, the pilot sees the prism 40 and the lights of the runway at the same distance through both the windshield and through the optical processer in the aircraft. This ability to see the lights of the runway through the windshield and through the processer simultaneously is achieved by means of the intervening beam splitter.

Several advantages are obtained by viewing the runway through an optical processor. First, by superimposition of the virtual image reflected on the gun sight over the actual image by proper positioning of the aircraft, angle-of-attack information is automatically provided as previously described. Furthermore, the pilot can carefully scrutinize his position both with respect to azimuth and elevation simultaneously with respect to the intended point of landing. As noted before, with existing optical glide slope references, the pilot must look at the runway center line for azimuth information and he must look off to one side of the runway for elevation or glide slope information.

Thus, it can be seen that a new and improved optical aid for providing glide slope information to aircraft has been provided. The invention is technically simple and inherently reliable. Azimuth and elevation information is provided to the pilot simultaneously within his field of vision with respect to the intended point of landing. The optical display is not positioned off to one side or the other of the runway as are all other optical displays in current use. The invention views and interprets the colored light beams for the pilot and presents the interpretation to the pilot in the conventional "meatball"/datum-bar format.

What is claimed is:

1. An optical glide slope reference indicator for aircraft comprising:

a source of white light located and supported beneath the centerline of a runway in the vicinity of the intended point of landing of said aircraft;

optical means arranged in the path of said white light for producing a vertical light spectrum consisting of at least three discrete, diverging, selectively predetermined colored light beams;

said colored light beams being transmitted into the atmosphere in the vicinity of the runway approach;

omnidirectional, monochromatic light sources located on opposite sides of said optical means for producing two parallel reference light beams which are transmitted into the atmosphere in the vicinity of the runway approach;

an optical processor located in said aircraft;

said optical processor including a prism for refracting the particular received colored light beam and the two reference light beams;

said optical processor further including means for displaying said refracted colored light beams symmetrically between said two reference light beams in a meatball datum bar format such that the vertical displacement of the refracted colored light beam with respect to the two horizontally aligned reference light beams visually indicates the glide slope of said aircraft, and, transparent display means positioned in the line-of-sight of the pilot for displaying the optical image produced by said optical processor.

2. The glide slope reference indicator of claim 1 wherein said optical means comprises a collimating lens positioned at a distance from said source of white light equal to the focal length of said collimating lens, a prism located in the path of the collimated white light produced by said collimating lens for producing a spectrum, and a cylindrical lens and a polarizing transparency positioned in the path of said prism.

3. The glide slope reference indicator of claim 1 wherein said optical processor further includes two identical spherical lenses positioned a distance from each other and from said prism equal to the focal length of the lenses.

References Cited

UNITED STATES PATENTS 3,138,779    6/1964    Murray et al.

RONALD L. WIBERT, Primary Examiner

O. B. CHEW II, Assistant Examiner

U.S. Cl. X.R.

356—172